No. 727,971. PATENTED MAY 12, 1903.
T. W. KING.
AUTOMATIC DAMPER.
APPLICATION FILED AUG. 21, 1902.

NO MODEL.

Witnesses
C. H. Walker.
Geo. E. Tew.

Inventor
Thomas W. King

By Miles B. Stevens Co.
Attorneys

No. 727,971. Patented May 12, 1903.

UNITED STATES PATENT OFFICE.

THOMAS W. KING, OF CLEVELAND, OHIO.

AUTOMATIC DAMPER.

SPECIFICATION forming part of Letters Patent No. 727,971, dated May 12, 1903.

Application filed August 21, 1902. Serial No. 120,521. (No model.)

*To all whom it may concern:*

Be it known that I, THOMAS W. KING, a citizen of the United States, residing at Cleveland, in the county of Cuyahoga and State of Ohio, have invented certain new and useful Improvements in Automatic Dampers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to automatic dampers, and has for its object improvements in the particular construction thereof and in the manner of operation.

The damper is balanced against the draft and acts to automatically change its position under the variations of the draft.

Figure 1:
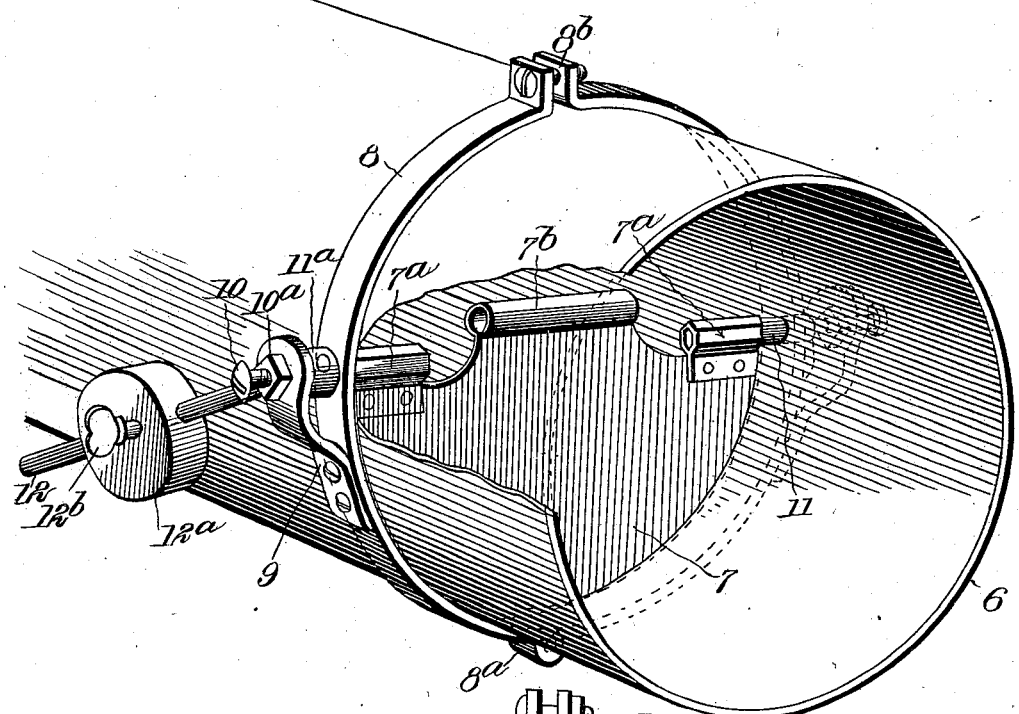
Figure 2:
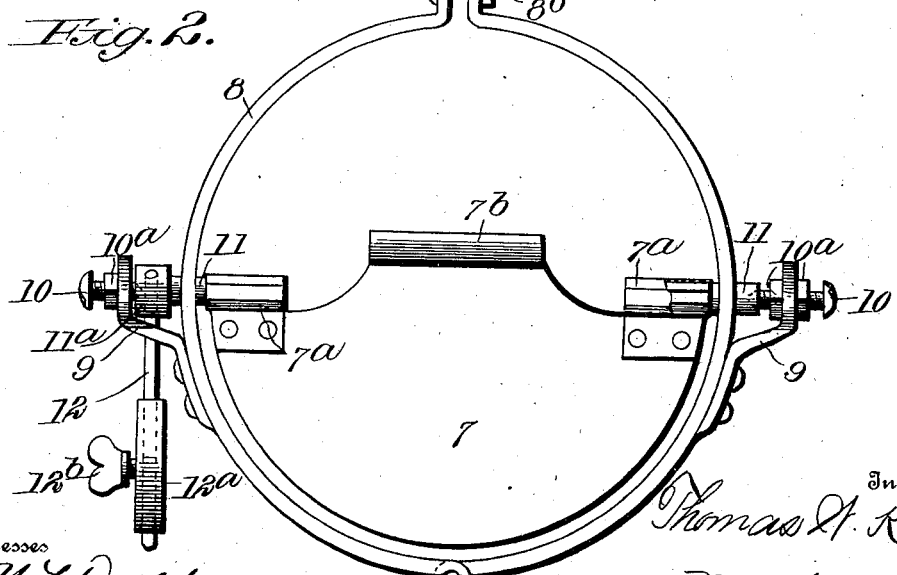

Referring to the accompanying drawings, Figure 1 is a perspective view of the damper as applied to a pipe, parts of the pipe being broken away to more clearly show the damper. Fig. 2 is an elevation of the damper detached from the pipe.

Referring specifically to the drawings, a smoke-pipe is indicated at 6, and the damper flap or plate at 7. This is preferably semicircular, or substantially so, and is supported within the pipe by means of a split ring 8, the halves of which are hinged together at one end, as at $8^a$, and joined at the other end by a bolt and nut $8^b$. The ring carries brackets 9, which support the pivots of the damper, said pivots being formed by pointed screws 10, which are adjustable and fixed at adjustment by binding-nuts $10^a$. The points of these pivot-screws engage pins 11, which pass through holes in the ring and in the pipe and enter sockets formed by hangers $7^a$, riveted to the damper-plate. The pins and sockets are preferably hexagonal, so that the inclination of the damper may be varied, as hereinafter explained. The head of one of the pins is enlarged, as at $11^a$, to receive an arm 12, upon which slides a balancing-weight $12^a$, secured at adjustment by thumb-nut $12^b$. The weight is set at adjustment according to the local conditions under which the damper is to operate, and the damper-plate is located on the pins at an angle determined by the same conditions.

Normally the damper by reason of the weight swings slightly open toward the direction from which the draft comes—in other words, toward the furnace—and the weight is so set that the damper is retained in this position under ordinary or desired draft. As the draft increases the damper is forced to a closed position and will swing to or from its closed position according to the fluctuations in the draft and under the influence of the weight, the leverage of which increases as the damper is raised by the draft. The damper does not stop against any projection in the pipe, but is balanced by the weight to a desired normal position, which may be predetermined and varied according to circumstances.

At $7^b$ is indicated a portion of the damper-plate, which is made to project above the axis and curved upon itself to give weight without obstructing the pipe to any great extent. The weight so placed serves to assist in balancing the damper.

What I claim as new is—

The combination with a pipe, of a damper comprising a valve-plate within the pipe, having pin-sockets, a ring around the pipe having brackets thereon, pins extending through the ring and pipe and adjustably into the sockets, adjustable pivot-screws supported in the brackets and engaging the outer ends of the pins, and an arm projecting from one of the pins and having an adjustable weight thereon.

In testimony whereof I affix my signature in presence of two witnesses.

THOMAS W. KING.

Witnesses:
JOHN A. BOMMHARDT,
U. C. SCHWERTNER.